Sept. 10, 1940.   G. W. CRABTREE   2,214,223
SPRING CLIP
Filed March 21, 1939
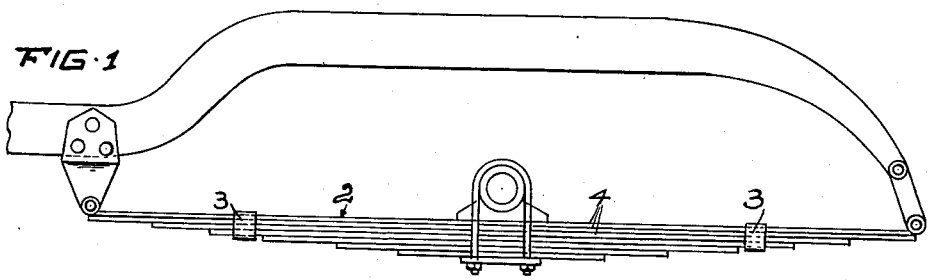
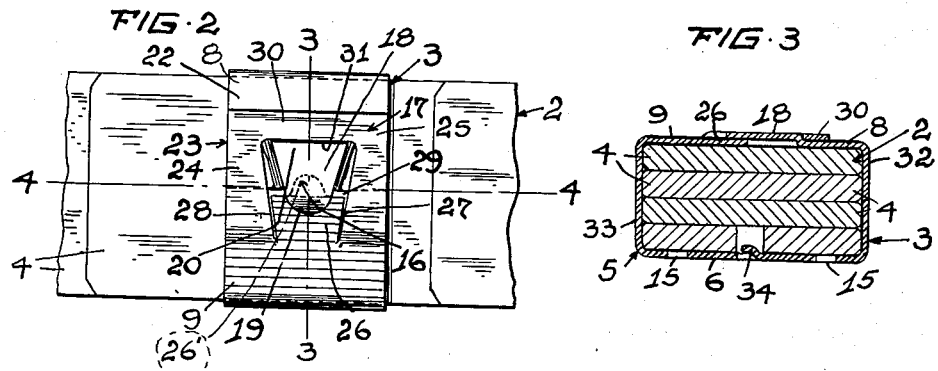
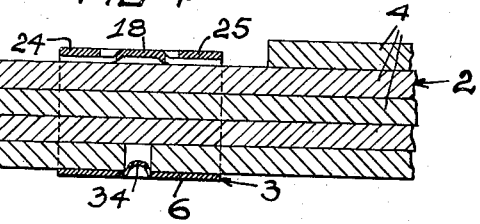
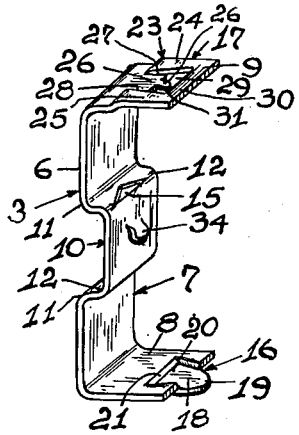
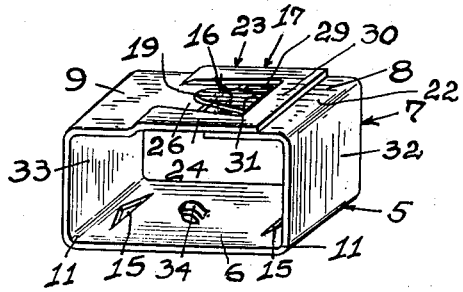
INVENTOR.
GEORGE W. CRABTREE
BY Gustav. A. Wolff
ATTORNEY.

Patented Sept. 10, 1940

2,214,223

UNITED STATES PATENT OFFICE 2,214,223

SPRING CLIP

George W. Crabtree, Cleveland Heights, Ohio

Application March 21, 1939, Serial No. 263,181

10 Claims. (Cl. 267—53)

My invention relates to an improvement in detachable clips for leaf springs, and in general my object is to provide a clip which is particularly constructed to be easily attached to a laminated vehicle spring and also readily removed therefrom, and which, when affixed to the spring leaves, will hold the same firmly against spreading or fanning. The clip which is readily foldable in its body portion on predetermined lines and is preferably made of slightly springing metal includes at its two end portions co-operating locking members adapted to readily interlock with each other with snap-like action and maintain the locking action under spring tension so as to prevent looseness and rattle and avoid accidental, undesirable opening up of the clip. Folding of the clip on predetermined lines permits of proper placing and clamping of the clip upon the vehicle spring and also permits of simplified separation and removal of the clip from said spring when the clip itself is to be detached therefrom.

The clip is formed from a substantially U-shaped clip blank provided with a parallelly offset portion in its web and the inner edges of this parallel offset are weakened by cut out portions to effect bending of the clip blank at these edges and therewith proper folding of the blank around the leaves of a spring without weakening the edges of the finished clip, all as hereinafter described in the following specification and shown in the accompanying drawing of an exemplified form of the invention, the drawing forming part of the specification.

In the drawing:

Fig. 1 is a side elevation of a vehicle spring equipped with a pair of clips made in accordance with the invention.

Fig. 2 is an enlarged view of one of the clips shown in Fig. 1, the clip being mounted upon an inverted portion of the vehicle spring.

Fig. 3 is a cross sectional view of the clip and spring shown in Fig. 2, the section being taken on line 3—3 of said figure.

Fig. 4 is a longitudinal sectional view of the clip and spring shown in Fig. 2, the section being taken on line 4—4 of said figure.

Fig. 5 is a perspective view of the clip blank prior to its bending and folding around a spring; and Fig. 6 is a perspective view of the clip formed from the clip blank and interlocked at its ends.

Referring now more particularly to the exemplified form of the invention disclosed in the drawing, I show in Fig. 1 a vehicle spring 2 of the leaf or laminated type, which spring is provided with metal clips 3 to prevent separation and lateral spreading of the superposed leaves 4. Clips 3, which may conveniently be attached and detached to and from spring 2, each embody a body 5 of substantial rectangular shape, weakened in definite areas of its web portion 6 to facilitate proper bending and folding operations of the clip around laminated vehicle spring 2, each consists of a substantially U-shaped metal band 7 made of slightly springing material. This U-shaped metal band has a web portion 6 of substantial greater length than the length of the flanges 8 and 9 of said band and, in addition, the central area 10 of the web portion 6 is parallelly inwardly offset by bending web portion 6 at substantially right angles at 11 and 12. Bends 11 are spaced from each other the full width of spring 2 around which band 7 is to be folded, and bends 12, the inner bends, are spaced from each other less than said width so as to effect resting of bends 12 against the face of spring 2 when band 7 is folded around spring 2 and therewith eliminate all stresses except tensile stresses in said bends 12 when clip 3 is tightly folded around spring 2. Bending and folding operations of band 7 are localized to inner bends 12 by triangular cut out portions 15, which cut out portions have their base line aligned with bends 12 and thus materially weaken bending with respect to that of lines 11.

When band 7 is folded around spring 2, flanges 8 and 9 overlap each other and their end portions interengage and interlock with each other by means of integral, cooperating snap-like locking means 16 and 17 which readily interengage and interlock with each other with snap-like action when locking means 16 and 17 are forcibly shifted toward each other. Locking means 16, a male locking member, embodies a struck up tongue 18, the front portion 19 of which is extended forwardly a substantial distance beyond the end of flange 8, and the rear end portion 20 of which forms a straight shoulder 21 extended upwardly from face 22 of flange 8. Preferably the front portion 19 of tongue 18 is slightly bent downwardly to facilitate engagement with the locking means 17, a female locking member arranged in the end portion of flange 9. Female locking member 17 embodies a raised struck up portion 23 of substantially U-shaped outline having extended into and between its flanges 24 and 25 a straight, not elevated tongue 26 embodying a finger-like extension 26'. This tongue is completely separated from flanges 24 and 25 by cutting band 7 on lines 27, 28. In addition there is provided a substantially rectangular opening 29 arranged between the end of tongue portion 26, the flanges 24, 25 and web 30 of raised portion 23. This opening has its straight edge 31 arranged parallel to the shoulder 21 on tongue portion 18 and co-operates with this shoulder in locking flanges 8 and 9 together. Preferably, the front end of straight tongue portion 26 and its extension 26' are slightly bent upwardly to effect a springing locking engagement between shoulder 21 and straight edge 31, as will hereinafter more clearly be described.

Clip 3 can readily and easily be folded around spring 2 on the predetermined bending lines 12 and then forms a rectangular clip which properly grips all laminations of the spring. In addition, the ends of the clip at the end of folding operations automatically align, interengage and interlock with each other with snap-like action and such aligning, interlocking and snap-like interlocking is effected by the shape and form of male and female locking members 16 and 17. Thus, when flanges 8 and 9 and therewith members 16 and 17 approach each other, front portion 19 of locking tongue 18 creeps under web 30 of raised portion 23 and guides flange 8 under flange 9; then portion 19 creeps on top of straight tongue portion 26 which yieldingly forces tongue 18 upwardly and finally forces tongue 18 and its straight shoulder 21 into edge to edge contact with the straight edge 31 of opening 29, provided tongue 18 is sufficiently advanced for an interlocking engagement with straight edge 31. At this time the flanges 8 and 9 are properly overlapped and all laminations of spring 3 are tightly held in contact with side portions 32 and 33 of the clip. An accidental opening up of the described locking engagement between flanges 8 and 9 is impossible as tongues 18 and 26 yieldingly hold shoulder 21 and edge 31 in proper alignment. Should it be desirable to remove clip 3, as for example in case of repair of spring 2, then a prying instrument can easily be inserted between overlapping flanges 8 and 9 to lift straight edge 31 from its interlocking engagement with shoulder 21, thereby permitting these parts to be readily separated. The clip can then be opened, unfolded and readily removed from the spring. Clip 3 is prevented from walking on spring 2 by the arrangement of a struck up portion 34 in web portion 6 of the clip, which struck up portion fits into perforations now present in practically all leaf springs and used for avoiding creeping of commonly used box clips on these springs.

The specific locking construction in the exemplified form shown in the drawing should not be considered to limit the invention to such particular form of locking member, as I am fully aware that many changes can be made in the details of construction and arrangement thereof without departing from the spirit of the invention and therefore I do not limit my invention in any way, shape or form, except as I may be limited by the hereto appended claims.

What I claim is:

1. A clip for laminated vehicle springs comprising a metal band of slightly springing material dimensioned to be folded to a box clip with overlapping end portions, and integral equally offset cooperating male and female locking means including cooperating shoulder portions on said end portions for automatically locking same disconnectibly together when shifted toward each other.

2. A clip for laminated vehicle springs comprising a metal band of slightly springing material adapted to be folded to a box clip having overlapping end portions, integral, parallelly offset male locking means on one end of said metal band and parallelly offset and cut out female locking means on the other end of said metal band, said offset male and female locking means being positioned in the same plane when interengaged with each other.

3. A clip for laminated vehicle springs comprising a metal band of slightly springing material adapted to be folded to a box clip with overlapping end portions, integral, equally offset male and female locking means on said end portions, and yielding means on said locking means holding said male and female locking means in interlocked position and effecting snap-like locking action between said locking means when said locking means are forced toward each other.

4. A clip for laminated vehicle springs comprising a metal band of slightly springing material having substantially U-shaped form and a parallel inward offset in its web portion, cut out portions in the side walls of said offset for facilitating bending of the web on predetermined lines to form said metal band to a box clip having overlapping end portions, and integral cooperating male and female locking means on said end portions.

5. A clip for laminated vehicle springs comprising a U-shaped metal band of slightly springing material having an elongated web portion and relatively short flanges, a U-shaped inward offset in said web portion arranged parallel to said portion in its central area, triangular cut out portions in the side walls of said U-shaped offset adjacent and parallel to the edges of the web of said offset for facilitating bending of said band on the edges of said web to a box clip having said flanges arranged in overlapping relationship, and integral equally offset cooperating male and female locking means on said flanges for locking same disconnectibly together.

6. A clip for laminated vehicle springs as described in claim 5, wherein the web of the U-shaped offset of said metal band includes an inwardly extended struck up finger portion adapted to cooperate with a perforation of the spring around which the clip is folded in preventing lateral shifting of the clip on such spring.

7. A clip for laminated vehicle springs comprising a metal band of slightly springing material adapted to be folded to a box clip with overlapping end portions, a struck up male locking member including a straight shoulder portion on one of said end portions, and a struck up female locking member including a cut out portion with a straight locking edge on the other of said end portion, said locking edge cooperating with said straight shoulder portion in interlocking said overlapping end portions.

8. A clip for laminated vehicle springs comprising a metal band of slightly springing material adapted to be folded to a box clip with overlapping end portions, one of said end portions having an integral struck up male locking member including at its rear end a straight locking shoulder portion and extended forwardly of the edge of said end portion, and the other of said end portions having a female locking member including a struck up portion, a cut out portion in said struck up portion formed with a straight, locking edge, and a yielding finger arranged in the plane of said end portion and extended in spaced relation toward the straight locking edge of said female locking member.

9. A clip for laminated vehicle springs comprising a metal band of slightly springing material bent to form a box clip having overlapping end portions, symmetrically arranged weakened bending areas in the bottom of said clip and integral equally offset cooperating male and female locking means including co-operating shoulder portions in the overlapping end portions of said metal band for automatically locking said end portions disconnectibly together when shifted toward each other.

10. A clip for laminated vehicle springs comprising a metal band of slightly springing material having substantially U-shaped form and a U-shaped offset in its web portion, arranged parallel thereto and narrower in width than the spring to which said clip is to be connected, said metal band being adapted to be bent to a box clip with overlapping end portions, and equally offset male and female locking means integrally formed in the overlapping end portions of said metal band.

GEORGE W. CRABTREE.